United States Patent [19]
Nakamura

[11] Patent Number: 5,808,291
[45] Date of Patent: Sep. 15, 1998

[54] IMAGE INFORMATION DETECTION SYSTEM AND OPTICAL EQUIPMENT USING THE SYSTEM

[75] Inventor: Kenji Nakamura, Sakai, Japan

[73] Assignee: Minolta Co., Ltd., Osaka, Japan

[21] Appl. No.: 697,568

[22] Filed: Aug. 28, 1996

[30] Foreign Application Priority Data

Aug. 30, 1995 [JP] Japan .................................. 7-221788
Aug. 30, 1995 [JP] Japan .................................. 7-221791
Aug. 30, 1995 [JP] Japan .................................. 7-221803

[51] Int. Cl.$^6$ .............................. G02B 7/04; G03B 13/36
[52] U.S. Cl. .................................. 250/201.7; 250/201.6; 396/96; 396/128
[58] Field of Search ............................ 250/201.6, 201.7, 250/208.1; 396/92, 96, 128

[56] References Cited

U.S. PATENT DOCUMENTS

| 4,300,824 | 11/1981 | Tokuda et al. . |
| 4,536,072 | 8/1985 | Taniguchi et al. . |
| 4,561,750 | 12/1985 | Matsumura . |
| 4,611,910 | 9/1986 | Suzuki et al. . |
| 4,618,235 | 10/1986 | Ishida et al. . |
| 4,633,075 | 12/1986 | Sakai et al. ........................... 250/201.7 |
| 5,721,977 | 2/1998 | Yamawaki et al. ...................... 396/96 |

*Primary Examiner*—Edward P. Westin
*Assistant Examiner*—Kevin Pyo
*Attorney, Agent, or Firm*—Burns, Doane, Swecker & Mathis, LLP

[57] ABSTRACT

The difference in brightness between the brightest area and the darkest area of the object of distance measurement can be speedily detected, as described above, and it can be determined before contrast calculation and correlation calculation are performed whether or not reliable distance measurement is possible. Therefore, where the object of distance measurement suffers from inadequate contrast, unnecessary performance of contrast calculation and comparative calculation regarding the distributions of accumulated charge can be avoided, so that the user can be promptly informed of the inadequacy in contrast and appropriate measures, such as emission of auxiliary light for distance measurement, can be speedily taken.

10 Claims, 11 Drawing Sheets

IMAGE INFORMATION DETECTION SYSTEM AND OPTICAL EQUIPMENT USING THE SYSTEM

BACKGROUND OF THE INVENTION

1. Field of the Invention

The present invention pertains to an image information detection system, such as a distance detection system or a focus detection system used in cameras, for example, that detects necessary information based on information taken from a pair of images that are formed on light receiving elements, as well as to optical equipment, such as cameras, binoculars and measuring instruments, in which the system is used.

2. Description of the Related Art

In a conventional camera having an autofocus function, the light from the object is led to a pair of line sensors to form two images, and focus adjustment for the photo-taking lens is carried out by detecting the object distance based on the difference in the location of the images. Specifically, using an optical system for distance measurement, the light from the object is led to a pair of line sensors each comprising photoelectric conversion elements and made to form an image, and correlation calculation is then performed in which the accumulated charges in the photoelectric conversion elements are compared between the two line sensors on a pixel-by-pixel basis, so that the distance between the two object images may be detected. The distance between the two object images is determined in accordance with the geometrical conditions of the distance measurement system, such as the distance between the distance measurement optical system and the line sensors, as well as the object distance. Conversely, when the distance between the two object images is obtained, the object distance is calculated in accordance with the geometrical conditions of the distance measurement system. Automatic focus adjustment relative to the object is carried out by controlling the motor that adjusts the focus position of the photo-taking lens in accordance with the object distance thus calculated.

In automatic focus adjustment in a single lens reflex camera, the light that enters the camera through the photo-taking lens is generally led to a pair of line sensors and a pair of object images are formed. Normally, the motor for adjusting the focus of the photo-taking lens is driven such that the distance between these two images coincides with the distance between two images that is achieved in in-focus state. In this case, automatic focus adjustment is performed directly without calculating the object distance, but the object distance may also be calculated where necessary based on the detected distance between the object images and the geometrical conditions of the distance measurement system.

In order to calculate the object distance using the method described above, it is required that the pair of images formed on the line sensors have adequate contrast. It is also preferred that the pair of images have approximately equal brightness.

For example, where the contrast is low, or in other words, where there is little difference in the accumulated charge among the photoelectric conversion elements of the line sensors, it is difficult to recognize the images, which in turn prevents accurate detection of the object distance or defocus amount.

Moreover, the user might block the optical path to one of the line sensors by mistake, or in a back-light photo-taking situation, extremely bright areas might occur in the image on one of the line sensors. In such cases, the reliability of correlation calculation is reduced, which prevents accurate distance measurement or accurate detection of the defocus amount.

As explained above, it is necessary to determine whether or not the contrast of the images on the line sensors is adequate, or whether or not there is a large difference in brightness between the pair of images. Therefore, conventionally, the contrast is calculated together with the correlation calculation, and determination regarding the brightness is carried out following the correlation calculation.

It is preferred that the images have a brightness equal to or higher than a certain level. If the images are uniformly dark, the reliability of the correlation calculation is reduced, which prevents accurate distance measurement or accurate detection of the defocus amount. As a result, the period of time in which photoelectric conversion and charge accumulation take place, or in other words, the integration time, is conventionally set at a prescribed period that would allow the images of an object having an average brightness to have adequate brightness.

However, this means that charge accumulation and reading are carried out at all times, and therefore it takes a long time to detect that the reliability of the correlation calculation is low or that the amount of light is insufficient. Where the reliability of the correlation calculation is low or the amount of light is insufficient, countermeasures may be taken, including providing a warning to the user and performing light emission from a distance measurement auxiliary light. However, where it takes a long time to detect that the reliability is low or that the amount of light is insufficient, as in the conventional model, implementation of these countermeasures will be delayed: photo-taking opportunities that the user seeks will therefore be missed because, for example, focusing of the camera cannot keep up with a moving object.

SUMMARY OF THE INVENTION

An object of the present invention is to provide an image information detection system in which the problems described above are resolved and which can speedily detect, when the reliability of measurement such as distance measurement and focus detection is low, that measurement is difficult, as well as an optical equipment in which the system is used.

Another object of the present invention is to provide an image information detection system that can reliably perform distance measurement or detect the focus condition, etc. in response to a change in the condition of the object of measurement, as well as an optical equipment in which the system is used.

In order to attain the objects described above, the present invention is an image information detection system that detects prescribed information of an object by leading the light from the object to be detected to a pair of light receiving element arrays and performing a comparative calculation of the distributions of charge accumulated in the light receiving element arrays, the image information detection system comprising: a first timer that counts the period of time required for the charge accumulated in a light receiving element of one of the light receiving element arrays, which first attained a prescribed level of accumulated charge, to reach said prescribed level; a second timer that counts the period of time required for the accumulated charges of all light receiving elements of one of the light element arrays to reach the prescribed level; a determiner that determines whether or not detected is possible based on the period of time counted by the first timer and the period of time counted by the second timer; and a calculator that carries out said comparative calculation when it is determined by said determiner that detection is possible.

The present invention is also an image information detection system that detects prescribed information of an object by leading the light from the object to be detected to a pair of light receiving element arrays and performing comparative calculation of the distributions of charge accumulated in said light receiving element arrays, said image information detection system comprising: a timer that counts the period of time required for the charge accumulated in a light receiving element of each of said light receiving element arrays, which first attained a prescribed level of accumulated charge, to reach said required level; a determiner that determines whether or not detection is possible based on the periods of time counted by said timers; and a calculator that carries out said comparative calculation when it is determined by said determiner that detection is possible.

BRIEF DESCRIPTION OF THE DRAWINGS

These and other objects and features of this invention will become clear from the following description, taken in conjunction with the preferred embodiments with reference to the accompanied drawings, in which.

DETAILED DESCRIPTION OF THE PREFERRED EMBODIMENTS

Figure 1:
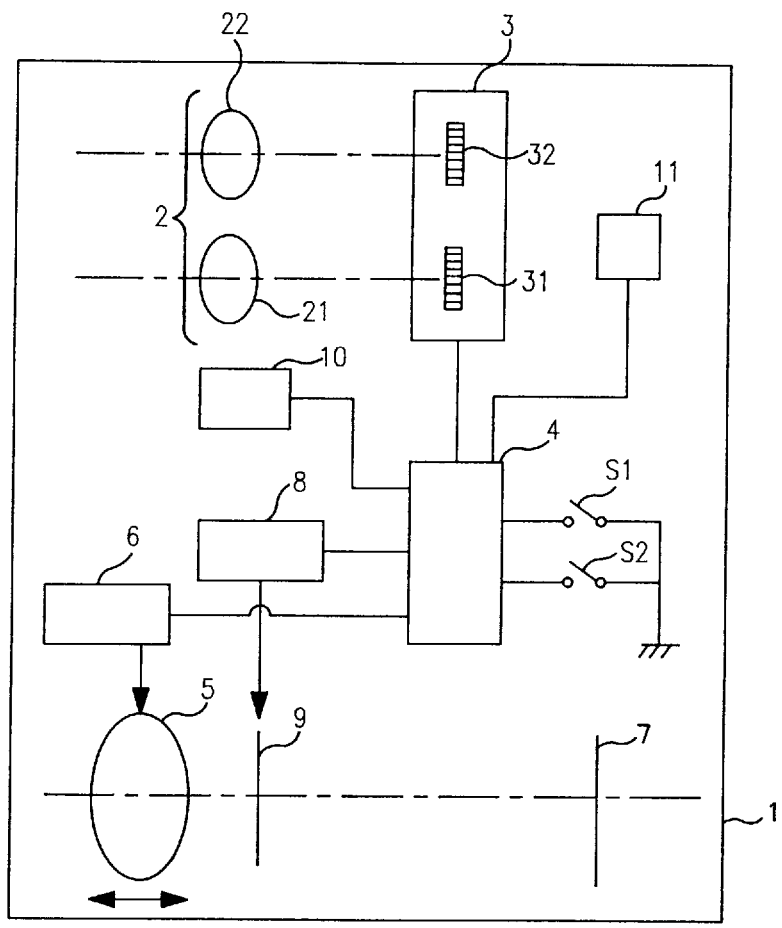
FIG. 1 shows an outline construction of an autofocus camera according to an embodiment of the present invention.

FIG. 1 shows a construction of an application in which a distance measurement system, an embodiment of the present invention, is applied in an autofocus camera. A camera body 1 is equipped with a distance measurement IC (AFIC) 3 having a pair of left and right line sensors 31 and 32, a distance measurement optical system 2 comprising left and right lenses 21 and 22 that cause the light from an object to form images on left and right line sensors 31 and 32, a distance measurement calculation device 4 comprising a microprocessor and connected to the AFIC 3, a photo-taking lens 5 and a lens drive device 6 that changes a focus position of the photo-taking lens 5. The line sensors 31 and 32 each comprises multiple photoelectric conversion elements aligned in one line.

A film 7 is located such that it is fed behind the photo-taking lens 5. A shutter unit 9 is located between the photo-taking lens 5 and the film 7. The shutter unit 9 is driven by an exposure control device 8. The lens drive device 6 and the exposure control device 8 are controlled by the distance measurement calculation device 4.

Further, the camera body 1 has an auxiliary light device 10 that emits auxiliary light for the purpose of distance measurement, a warning device 11 that comprises an LED and issues a warning to the user by turning ON when distance measurement cannot be carried out, and two switches S1 and S2 that operate in response to a shutter release button, which are connected to the distance measurement calculation device 4. The switch S1 closes when the release button is pressed down to the first stroke, and the switch S2 closes when the release button is pressed further down. When the switch S1 closes, the distance measurement calculation device 4 instructs the AFIC 3 to start photoelectric conversion by line sensors 31 and 32, whereupon distance measurement commences. When the switch S2 closes, the distance measurement calculation device 4 instructs the exposure control device 8 to operate shutter unit 9, whereupon photo-taking takes place.

After causing the AFIC 3 to perform photoelectric conversion for a prescribed period of time, the distance measurement calculation device 4 instructs the AFIC 3 to stop the photoelectric conversion. Then the distance measurement calculation device 4 reads the potential corresponding to the accumulated charge of each of the photoelectric conversion elements of the line sensors 31 and 32. The distance measurement calculation device 4 performs a correlation calculation in which the potentials are compared between the left and right line sensors on a pixel-by-pixel basis, to calculate the object distance, and drives photo-taking lens 5 via the lens drive device 6 in accordance with the object distance thus calculated. The series of processes from photoelectric conversion to distance measurement calculation to driving the lens is repeated at all times while the switch S1 is closed, or in other words, while the release button is pressed down to the first stroke. Through this operation, photo-taking lens 5 is in focus relative to the object at all times regardless of the movement of the object. When the release button is pressed down further and the switch S2 closes, shutter unit 9 opens by means of exposure control device 8 and the light from the object forms an image on the film 7, whereupon a clear image of the object is recorded on the film 7.

Figure 2:
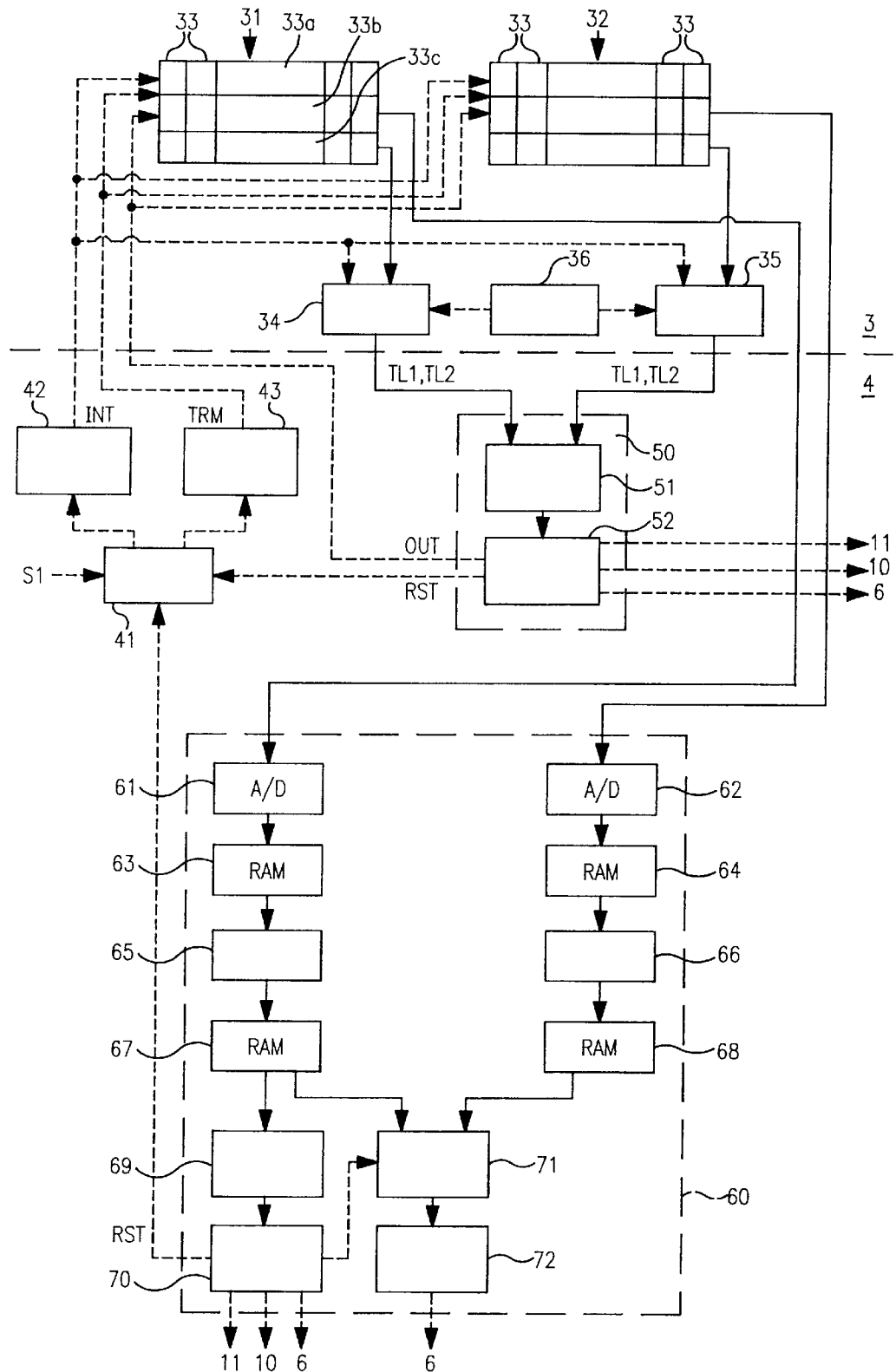
FIG. 2 is a block diagram showing a construction of a distance measurement IC and a distance measurement calculation device, as well as the flow of signals in a first embodiment.

FIG. 2 shows a construction of the AFIC 3 and the distance measurement calculation device 4 of the first embodiment. In the drawing, the solid arrow represents the flow of data to be processed and the dotted arrow represents the flow of control signals. The AFIC 3 has, in addition to the left and right line sensors 31 and 32, two counters 34 and 35 as well as a clock 36 that provides clock signals to the counters. Each of photo-electric conversion elements 33 that comprise left and right line sensors 31 and 32 comprises a photoreceptor portion 33a, an accumulation portion 33b and latch portion 33c. The photoreceptor portion 33a converts the light received into an electric charge and outputs the electric charge to the accumulation portion 33b. The accumulation portion 33b accumulates the electric charge provided by the photoreceptor portion 33a as potential. The latch portion 33c is located to correspond to each accumulation portion 33b so that output a latch signal when the potential of accumulation portion 33b has increased and reached to a prescribed level, or when an instruction is received from the distance measurement calculation device 4. In each of left and right line sensors 31 and 32, 128 photoelectric conversion elements 33 having above-mentioned construction are aligned The distance measurement calculation device 4 is equipped with a timer 41 that starts the counting of time based on the closing of switch S1, an integration start instruction circuit 42 that generates integration start signals INT to instruct the line sensors 31 and 32 to start photo-electric conversion and charge accumulation based on a signal from the timer 41, and an integration termination instruction circuit 43 that generates integration termination signals TRM to instruct the line sensors 31 and 32 to terminate photoelectric conversion and charge accumulation based on a signal from the timer 41. The distance measurement calculation circuit 4 is also equipped with a distance measurement calculation unit 60 that performs various calculations regarding distance measurement and a contrast detection unit 50 that determines whether or not the images formed on the line sensors 31 and 32 have adequate contrast prior to the performance of distance measurement calculations by the distance measurement calculation unit 60. These constructions and operations will be described below.

When the shutter release button is pressed to the first stroke and the switch S1 closes, the timer 41 starts the counting of time and sends the integration start instruction circuit 42 a signal to instruct the system to commence the generation of signals. Based on the instruction signal from the timer 41, the integration start instruction circuit 42 provides integration start signals INT to the left and right line sensors 31 and 32. These integration start signals INT are also provided to the counters 34 and 35, whereupon the counters 34 and 35 start the counting of time based on clock signals from the clock 36. When a prescribed period of time TE has elapsed after the counting of time is commenced, the timer 41 provides the integration termination instruction circuit 43 a signal which indicates the passage of prescribed period of time TE and whereby terminates integration.

Based on the integration start signals INT, accumulation portions 33b of all photoelectric conversion elements 33 carry out initialization, in which the accumulated charge is released and the potential is returned to zero, and the photoreceptors 33a start photoelectric conversion. The charge that was generated through the photoelectric conversion by photoreceptor portion 33a is provided to accumulation portion 33b, and the potential of the accumulation portion 33b increases in accordance with the amount of light received by the photoreceptor portion 33a. When the potential of the accumulation portion 33b reaches a prescribed level V0, a latch signal is output from the latch portion 33c. The photoelectric conversion by the photoreceptor portion 33a and the charge accumulation by the accumulation portion 33b continue after the output of a latch signal from the latch portion 33c.

When the prescribed period of time TE has elapsed after the start of integration, integration termination signals TRM are sent to all photoelectric conversion elements 33 from the integration termination instruction circuit 43 based on a signal from the timer 41. The photoreceptor portion 33a of each photoelectric conversion element 33 stops photoelectric conversion based on the integration termination signal TRM, and the accumulation portion 33b maintains the accumulated charge. The latch portion 33c outputs a latch signal if the latch portion 33c has not output a latch signal after receiving the integration start signal INT. Therefore, each photoelectric conversion element 33 outputs a latch signal either when the accumulated charge has reached a prescribed level or when the integration is terminated.

The latch signals from all photoelectric conversion elements 33 of the left line sensor 31 are input to the counter 34, while the latch signals from all photoelectric conversion elements 33 of the right line sensor 32 are input to the counter 35. The counters 34 and 35 have started the counting of time simultaneously with the start of integration based on the integration start signals INT, and when the latch signals are input, they can measure the time that has elapsed since the start of integration.

The counter 34 counts the number of latch signals input from the left line sensor 31. When the first latch signal is input to the counter 34, the counter 34 outputs a signal that indicates passage of period TL1 to that point to the contrast detection unit 50, and when the 128th, or last, latch signal is input to the counter 34, the counter 34 outputs a signal that indicates passage of period TL2 to that point to contrast detection unit 50. Similarly, the counter 35 counts the number of the latch signals input from right line sensor 32. When the first and last latch signals are input to the counter 35, the counter 35 outputs to the contrast detection unit 50 signals of period TR1 and period TR2 counted since the start of integration, respectively.

Figure 5A:
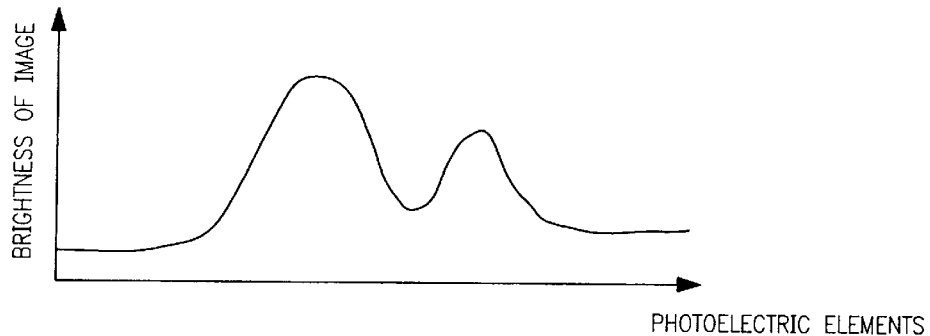
FIG. 5 shows a relationship between the brightness of the image on a line sensor and the period of time required for the potentials of the photoelectric conversion elements comprising the line sensor to reach a prescribed level.
Figure 5B:
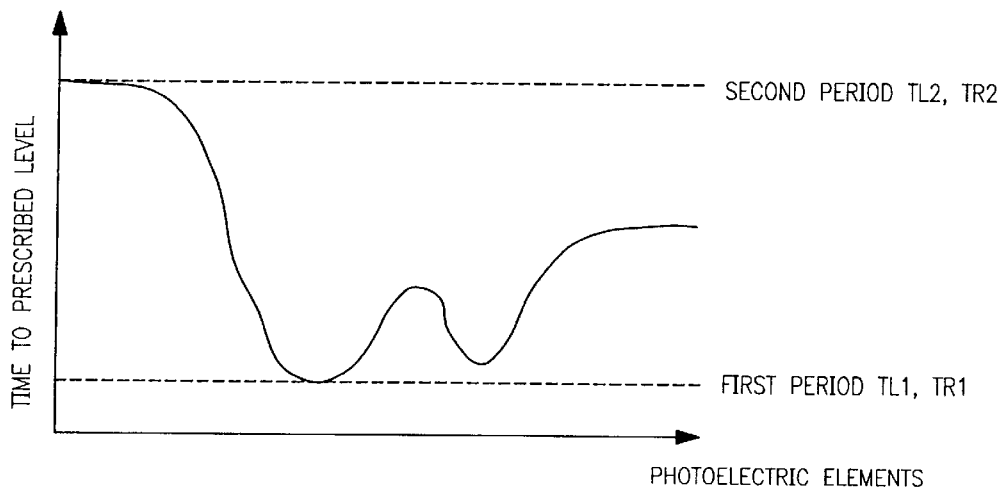

The first periods TL1 and TR1 output from the counters 34 and 35, respectively, represent the time required for the accumulated charge of the brightest area of each of left and right line sensors 31 and 32, i.e., of the photoelectric conversion element of each of the left and right line sensors 31 and 32 that has the largest amount of light received, to have reached the prescribed level. The second periods TL2 and TR2 represent the time required for the accumulated charge of the darkest area of each of the left and right line sensors 31 and 32, i.e., of the photoelectric conversion element of each of left and right line sensors 31 and 32 that has the smallest amount of light received, to have reached the prescribed level. In other words, the second periods TL2 and TR2 represent the time required for the accumulated charges of all photoelectric conversion elements of each of line sensors 31 and 32 to have reached the prescribed level, or the integration time TE. FIG. 5 shows a relationship between the brightness of the image and the first and second periods.

The contrast detection unit 50 comprises a first contrast calculation circuit 51 and a first distance measurement possibility determination circuit 52. The first contrast calculation circuit 51 is provided four periods TL1 and TL2, and TR1 and TR2 from counters 34 and 35, respectively, and calculates two values PL and PR based on equations (1) and (2).

$$PL = \log(TL2/TL1)/\log 2 \quad (1)$$
$$= \log_2(TL2/TL1)$$

$$PR = \log(TR2/TR1)/\log 2 \quad (2)$$
$$= \log_2(TR2/TR1)$$

The time required for the potential of the accumulation portion 33b of the photoelectric conversion element 33 to reach the prescribed level V0 is inversely proportional to the brightness of the portion of the image that is formed on that photoelectric conversion element. Therefore, the larger the ratio TL2/TL1 or TR2/TR1, the greater the difference in brightness between the brightest area and the darkest area in each of left and right line sensors 31 and 32. The value PL or PR obtained via equation (1) or (2) as the logarithm of the value of the ratio of these periods represents the relative E,value regarding the brightest area and the darkest area: the brightness differs by 100% each time the value increases or decreases by one. When there is no difference in brightness between the brightest area and the darkest area, or in other words, when there is no contrast in the image whatsoever, the value of PL or PR will be zero.

The first distance measurement possibility determination circuit 52 determines, based on the two values PL and PR described above, whether or not the images formed on left and right line sensors 31 and 32 have adequate contrast for distance measurement. Specifically, in this embodiment, The values PL and PR are compared with a prescribed value P0. Where both values PL and PR are equal to or larger than the prescribed value P0, it is determined that distance measurement is possible, and where either value PL or PR is smaller than the prescribed value P0, it is determined that the contrast is inadequate and therefore distance measurement cannot be performed.

Where it is determined in this step that distance measurement is not possible, the distance measurement possibility determination circuit 52 informs the user of the inadequacy of contrast by causing the LED of the warning device 11 to flash, and sends the timer 41 a restart signal RST instructing line sensors 31 and 32 to carry out photoelectric conversion and charge accumulation again. Then, the distance measurement possibility determination circuit 52 causes the auxiliary light device 10 to emit light. Where the images on left and right line sensors 31 and 32 lack adequate contrast because the entire object is dark due to insufficient light, distance measurement is made possible by irradiating the object using distance measurement auxiliary light as described above. When neither of the two values PL and PR reaches the level P0 even when photoelectric conversion and charge accumulation are performed using auxiliary light, the LED of the warning device 11 is lit to inform the user that distance measurement is not possible, and the lens drive device 6 is controlled such that the focus of the photo-taking lens 6 is adjusted to infinity.

Since integration is discontinued when the potentials of accumulation portions 33b of all photoelectric conversion elements 33 do not reach the prescribed value V0 within the integration time TE, the second period TL2 or TR2 represents the integration time TE in such a case. Then, the value of PL or PR does not represent a difference in brightness between the brightest area and the darkest area of the image. However, in this case, when the darkest area is so dark that the prescribed potential V0 is not reached even if photoelectric conversion is performed for as long as the prescribed integration time TE, so long the brightest area has a certain level of brightness, or in other words, so long as the value of TL1 or TR1 is equal to or smaller than a certain level, adequate contrast can be deemed to exist. Therefore, it is quite acceptable to determine the possibility of distance measurement by comparing the values PL and PR with the prescribed value P0 in this case as well.

Conversely, because the value of TL2 or TR2 cannot become larger than the integration time TE, when the value of TL1 or TR1 is equal to or larger than a certain value, it can be determined that the contrast is inadequate. Specifically, a prescribed time T0 that satisfies $T0=TE/2^{P0}$ is set, and where the value of TL1 or TR1 is larger than the prescribed value T0, it is determined that the contrast is inadequate. In this case, the first periods TL1 and TR1 are directly supplied to the first distance measurement possibility determination circuit 52 from counters 34 and 35, respectively, and the possibility of distance measurement is determined.

When at least one of the first periods TL1 or TR1 exceeds the prescribed value T0, at least either PL or PR will be smaller than the prescribed value P0 even if photoelectric conversion is performed for as long as the prescribed integration time TE, and therefore it does not make any sense to continue photoelectric conversion after TL1 and TR1 are detected. Photoelectric conversion may thus be terminated when the contrast is determined to be inadequate in the manner described above. However, where both first periods TL1 and TR1 are equal to or smaller than prescribed value T0, the value PL and PR must be calculated and compared with the prescribed value P0 for the purpose of determination regarding the adequacy of contrast.

Instead of calculating the difference in brightness between the brightest area and the darkest area of each of the images on left and right line sensors 31 and 32 as the value of a ratio using equations (1) and (2), the first contrast calculation circuit 51 may calculate the difference in brightness between the brightest area and the darkest area as a difference between the second period and the first period using equations (3) and (4).

$$DL=TL2-TL1 \quad (3)$$
$$DR=TR2-TR2 \quad (4)$$

And then, the first distance measurement possibility determination circuit 52 compares the two values DL and DR with a prescribed value D0, and when both values DL and DR are equal to or larger than D0, it determines that distance measurement is possible. When either TL1 or TR1 exceeds a prescribed value T0' that is set such that it will satisfy T0'=TE−D0, photoelectric conversion may be terminated by determining that the contrast is adequate.

Where the images on left and right line sensors 31 and 32 are determined to have adequate contrast based on the value PL and PR or DL and DR, the distance measurement possibility determination circuit 52 sends left and right line sensors 31 and 32 signals OUT that instructs the sensors 31 and 32 to output the potentials of accumulation portions 32b. Each photoelectric conversion element 33 outputs the potential of accumulation portion 33b to the distance measurement calculation unit 60 in response to the signal OUT.

The distance measurement calculation unit 60 comprises A/D converters 61 and 62, RAMs 63 and 64, difference circuits 65 and 66, RAMs 67 and 68, a second contrast calculation circuit 69, a second distance measurement possibility determination circuit 70, a correlation calculation circuit 71 and an object distance calculation circuit 72. The potentials output from the photoelectric conversion elements 33 of left line sensor 31 are sequentially converted into digital values by the A/D converter 61, and post-conversion values VL1 through VL128 for the 128 pixels are stored in the RAM 63. The potentials output from the photoelectric conversion elements 33 of right line sensor 32 are similarly sequentially converted into digital values by the A/D converter 62, and post-conversion values VR1 through VR128 for the 128 pixels are stored in the RAM 64.

The difference circuit 65 reads the pixel values from the RAM 63 and calculates the difference in value for every four pixels ($AL_j = VL_{j+4} - VL_j, j=1,2, \ldots, 124$), and difference values AL1 through AL124 are stored in the RAM 67. The difference circuit 66 similarly calculates the difference in pixel values from the RAM 64 for every four pixels ($AR_j = VR_{j+4} - VR_j, j=1,2, \ldots, 124$) and difference values AR1 through AR124 are stored in the RAM 68. Calculating the differences in value in this way is called filtering. Through this process, the difference in sensitivity between left and right line sensors 31 and 32 is eliminated and the reliability of the correlation calculation improves.

The second contrast calculation circuit 69 calculates contrast value C based on equation (5) shown below using the data from the RAM 67.

$$C = \sum_{j=1}^{123} |AL_{j+1} - AL_j| \tag{5}$$

The result of the calculation described above is input to the second distance measurement possibility determination circuit 70, which determines whether or not distance measurement is possible based on contrast value C thus calculated. Specifically, the contrast value C is compared with a prescribed value C0, and where the contrast value C is equal to or larger than the prescribed value C0, it is determined that distance measurement is possible, and where the contrast value C is smaller than the prescribed value C0, it is determined that the reliability of the correlation calculation is low due to inadequate contrast and therefore distance measurement is not possible.

Where it is determined that distance measurement is not possible, the second distance measurement possibility determination circuit 70 causes the LED of the warning device 11 to flash, in the same manner as the first distance measurement possibility determination circuit 52 described above, to notify the user that the contrast is inadequate, and at the same time, sends the timer 41 a restart signal RST, causing photoelectric conversion and charge accumulation to be performed by line sensors 31 and 32 again. When this takes place, the distance measurement possibility determination circuit 52 causes the auxiliary light device 10 to emit light to irradiate the object. When the contrast value C calculated is smaller than the value C0 even after photoelectric conversion and charge accumulation are carried out again following the irradiation from the auxiliary light, the LED of the warning device 11 is continuously lit to notify the user that distance measurement is not possible, and the lens drive device 6 is controlled such that the focus of photo-taking lens 5 is adjusted to infinity.

Where it is determined that distance measurement is possible, the second distance measurement possibility determination circuit 70 instructs the correlation calculation circuit 71 to start correlation calculation. The correlation calculation circuit 71 carries out calculation pursuant to equation (6) in order to obtain the correlation between the pixel values of RAM 67 and those of RAM 68. H(m, k) obtained in this calculation represents the degree of matching between the left and right images compared. The smaller this value, the higher the degree of matching.

$$H(m,k) = \sum_{j=1}^{40} |AL_{40(m-1)+j+2} - AL_{k+j-1}| \tag{6}$$

$(m = 1,2,3), (k = 1,2, \ldots, 85)$

In this embodiment, pixels AL3 through AL122 of RAM 67 are divided into three blocks each comprising 40 pixels (AL3 through AL42), (AL43 through AL82) and (AL83 through AL122), and each block is compared with 85 pixel blocks of RAM 68, i.e., (AR1 through AR40) through (AR85 through AR124), each block comprising 40 pixels and the a first pixel of the blocks moving by one pixel. The 255 values H(1,1) through H(3,85) obtained through the calculation are sent to the object distance calculation circuit 72.

The object distance calculation circuit 72 seeks a H(m1, k1) which is the smallest one among H(1,1) through H(3,85) provided by correlation calculation circuit 71. The values m1 and k1 found here indicate that the m1-st/-nd/-rd block from among the three blocks of RAM 67, and the block of RAM 68 that starts with the k1-th pixel, have the highest degree of matching. Interpolation is performed using the H(m1,k1), H(m1,k1−1) and H(m1,K1+1) to calculate k0, or the value of k that realizes the highest degree of matching HO(m1,k0). Then, in consideration of the alignment pitch of photoelectric conversion elements 33 and the distance between left and right line sensors 31 and 32, the distance between the image areas of line sensors 31 and 32 that best match each other is calculated from the first pixel number of the m1-st/-nd/-rd block (40×m1−37=3,43,83) and the value of K0. Then the distance to the object is calculated, based on the distance between the images calculated in the manner described above and the geometrical conditions of the distance measurement system such as the distance between the distance measurement optical system 2 and the line sensors 31 and 32.

The object distance calculation circuit 72 outputs the object distance thus calculated to the lens drive device 6. The lens drive device 6 calculates the focus position for the photo-taking lens 5 that corresponds to the object distance thus provided, and sets the focus position of the photo-taking lens 5. In this way, the autofocus function is carried out.

Figure 3:
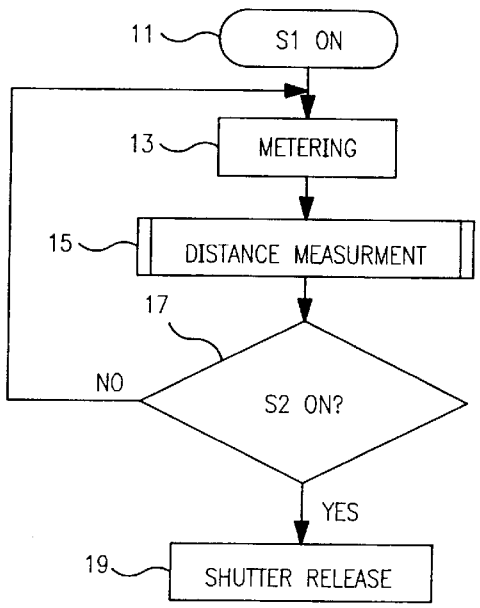
FIG. 3 is a flow chart showing a sequence of the routine when a light measurement switch of the camera of the first embodiment is closed.

The camera operations described above will be explained with reference to the flow charts of FIGS. 3 and 4. First, as shown in FIG. 3, when the switch S1 closes by pressing of the shutter release button down to the first stroke (step #11), the light measurement routine (step #13) and distant measurement routine (step #15) are carried out. It is then determined whether or not switch S2 is closed (step #17), and if it is not yet closed, the light measurement and distance measurement routines described above are repeated. On the other hand, where switch S2 is closed, the shutter release operation is performed so that the film will be exposed.

Figure 4:
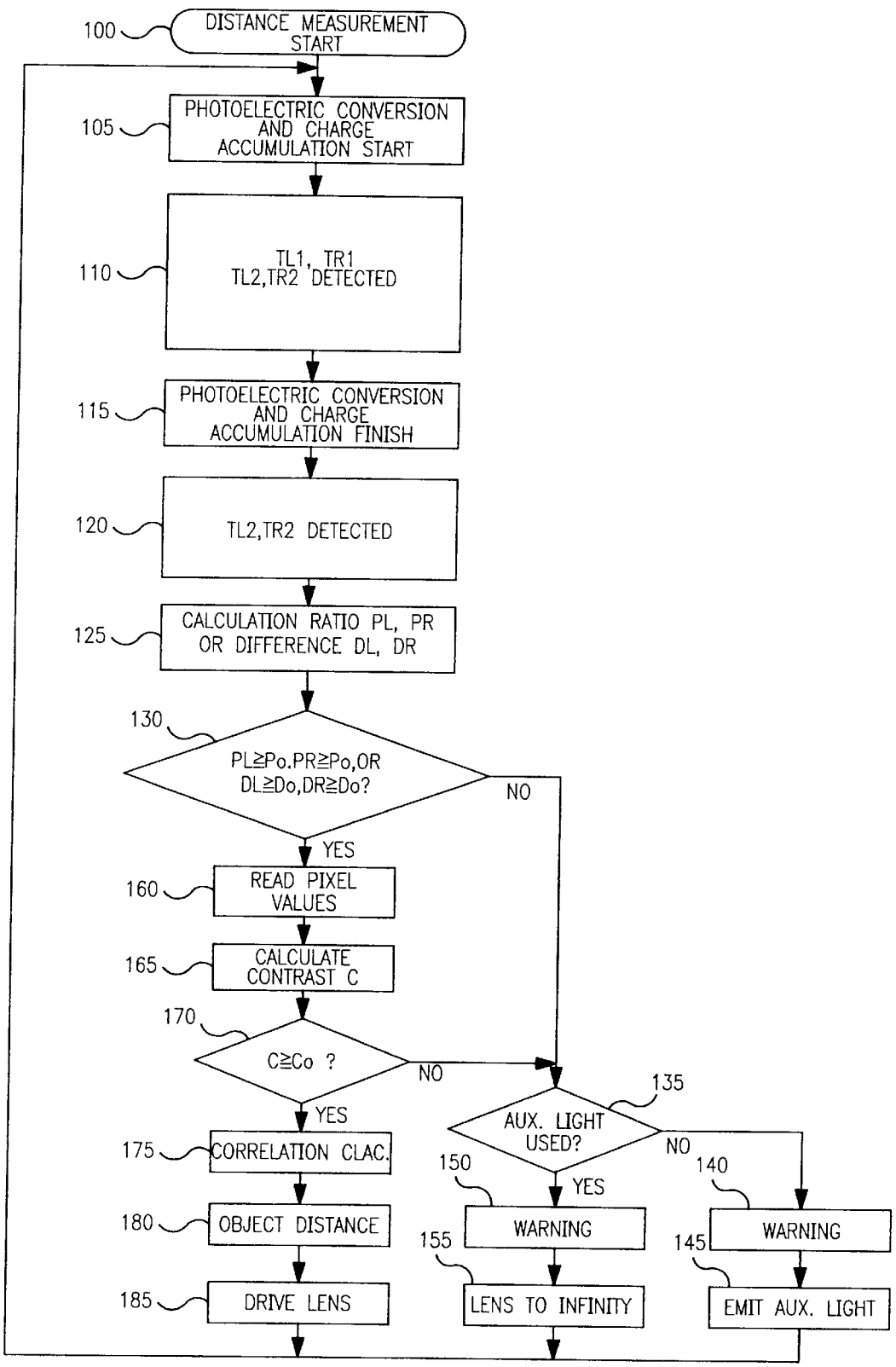
FIG. 4 is a flow chart showing a sequence of a distance measurement routine in the first embodiment.

To explain the distance measurement routine in more detail with reference to FIG. 4, when the distance measurement routine starts by the pressing of the shutter release button down to the first stroke (step #100), photoelectric conversion and charge accumulation start based on the integration start signals INT (step #105). As photoelectric conversion progresses, the accumulated charges of photoelectric conversion elements 33 increase, and the first period TL1(TR1) in which the potential of the brightest area has reached prescribed potential V0 and the second period TL2 (TR2) in which the potential of the darkest area has reached prescribed potential V0 are detected (step #110). When the prescribed integration time TE has elapsed, the integration termination signals TRM are generated, whereupon photoelectric conversion and charge accumulation are terminated (step #115). Where the potential of the darkest area has not reached prescribed level V0, the second period TL2(TR2) is detected at this time (step #120).

By calculating ratio PL (PR) or difference DL (DR) between the second and first periods, the difference in brightness between the brightest area and the darkest area is detected (step #125). The value of a ratio PL (PR) or the difference value DL (DR) is compared with the prescribed value P0 or D0 to determine whether or not the images on the two line sensors have adequate contrast (step #130). Where one of the images on the two line sensors suffers inadequate contrast, it is determined whether or not the auxiliary light has been used for charge accumulation in that line sensor (step #135). If the auxiliary light has not yet been used, the user is warned that the contrast is inadequate (step #140), the auxiliary light is emitted (step #145), and photoelectric conversion and charge accumulation are performed again (step #105). Where it is determined in step #135 that the auxiliary light has been used, the user is warned that distance measurement is not possible (step #150), and the focus of the photo-taking lens 5 is adjusted to infinity (step #155). Then the process returns to step #105, whereupon photoelectric conversion and charge accumulation are started again.

When it is determined in step #130 that the images on the two line sensors have adequate contrast, the potentials, or the pixel values, of the photoelectric conversion elements of line sensors 31 and 32 are read to the distance measurement calculation unit 60 (step #160). Then, as shown in equation (5), the contrast is precisely calculated from the differences in value between adjacent pixels (step #165). By comparing the contrast value C thus calculated with the prescribed value C0, it is determined whether or not reliable correlation calculation can be performed (step #170). When the contrast value C is smaller than prescribed value C0, it is determined that reliability would be low due to inadequate contrast, and the process advances to step #135, in which a previously-described routine takes place. When the contrast value C is equal to or larger than the prescribed value C0, it is determined that object distance can be calculated with high reliability, and correlation calculation regarding the images on the two line sensors is carried out based on equation (6) (step #175), the object distance is calculated (step #180), and the photo-taking lens 5 is driven so that it will be in focus relative to the object (step #185).

While the process after the reading of the potentials of the photoelectric conversion elements of line sensors 31 and 32 is approximately the same as in the conventional method, the present invention differs from the conventional distance measurement system in that determination is made as to the difference in brightness between the brightest area and the darkest area in each of line sensors 31 and 32 prior to the reading of the potentials. The detection of first periods TL1 and TR1 and second periods TL2 and TR2 is performed in conjunction with the photoelectric conversion and charge accumulation, and determination as to the difference in brightness between the brightest area and the darkest area of each of the images is completed before the termination of charge accumulation, or immediately after the termination of charge accumulation at the latest. Therefore, where either image suffers from inadequate contrast, appropriate countermeasures can be taken immediately without performing reading of the potentials of the photoelectric conversion elements, which requires a long time, or contrast or correlation calculation, as in the conventional method.

In the embodiment described above, an explanation was given with reference to an example in which determination as to the difference in brightness between the brightest area and the darkest area is made for each of left and right line sensors 31 and 32 by detecting the first and second periods for both line sensors, but it is also acceptable if determination as to the difference in brightness between the brightest area and the darkest area is made by detecting the first and second periods for either one of the line sensors. In that case, it is not necessary for the photoelectric conversion elements 33 of the other line sensor to have latch portions 33c, and one of counters 34 and 35 also becomes unnecessary. However, the reliability of the determination is higher if the difference in brightness between the brightest area and the darkest area is determined for both line sensors 31 and 32.

Using the distance measurement system pertaining to the first embodiment of the present invention, the difference in brightness between the brightest area and the darkest area of the object of distance measurement can be speedily detected, as described above, and it can be determined before contrast calculation and correlation calculation are performed whether or not reliable distance measurement is possible. Therefore, where the object of distance measurement suffers from inadequate contrast, unnecessary performance of contrast calculation and comparative calculation regarding the distributions of accumulated charge can be avoided, so that the user can be promptly informed of the inadequacy in contrast and appropriate measures, such as emission of auxiliary light for distance measurement, can be speedily taken.

Second Embodiment

Figure 6:
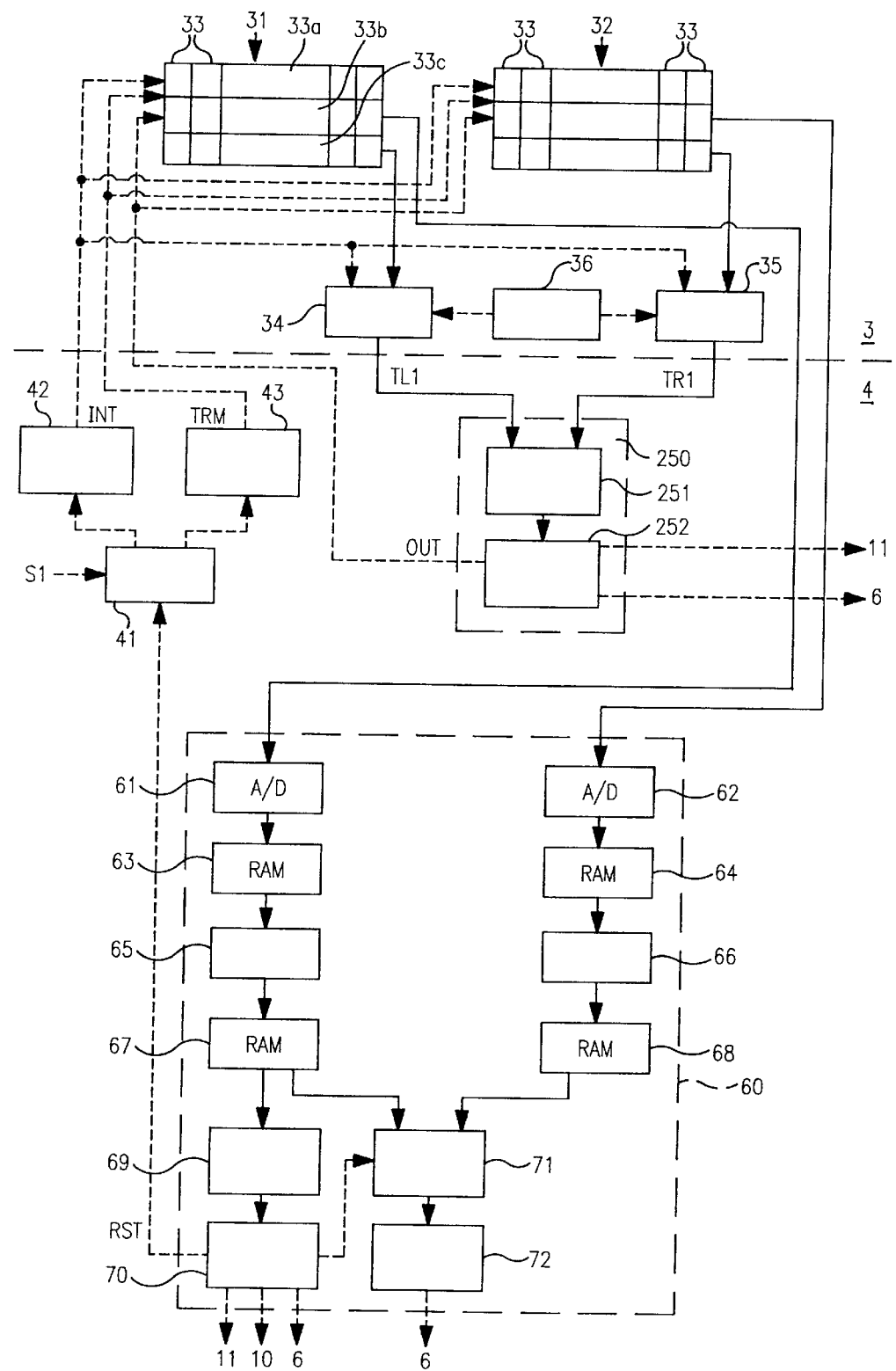
FIG. 6 is a block diagram showing a construction of a distance measurement IC and a distance measurement calculation device, as well as the flow of signals in a second embodiment.
Figure 7:
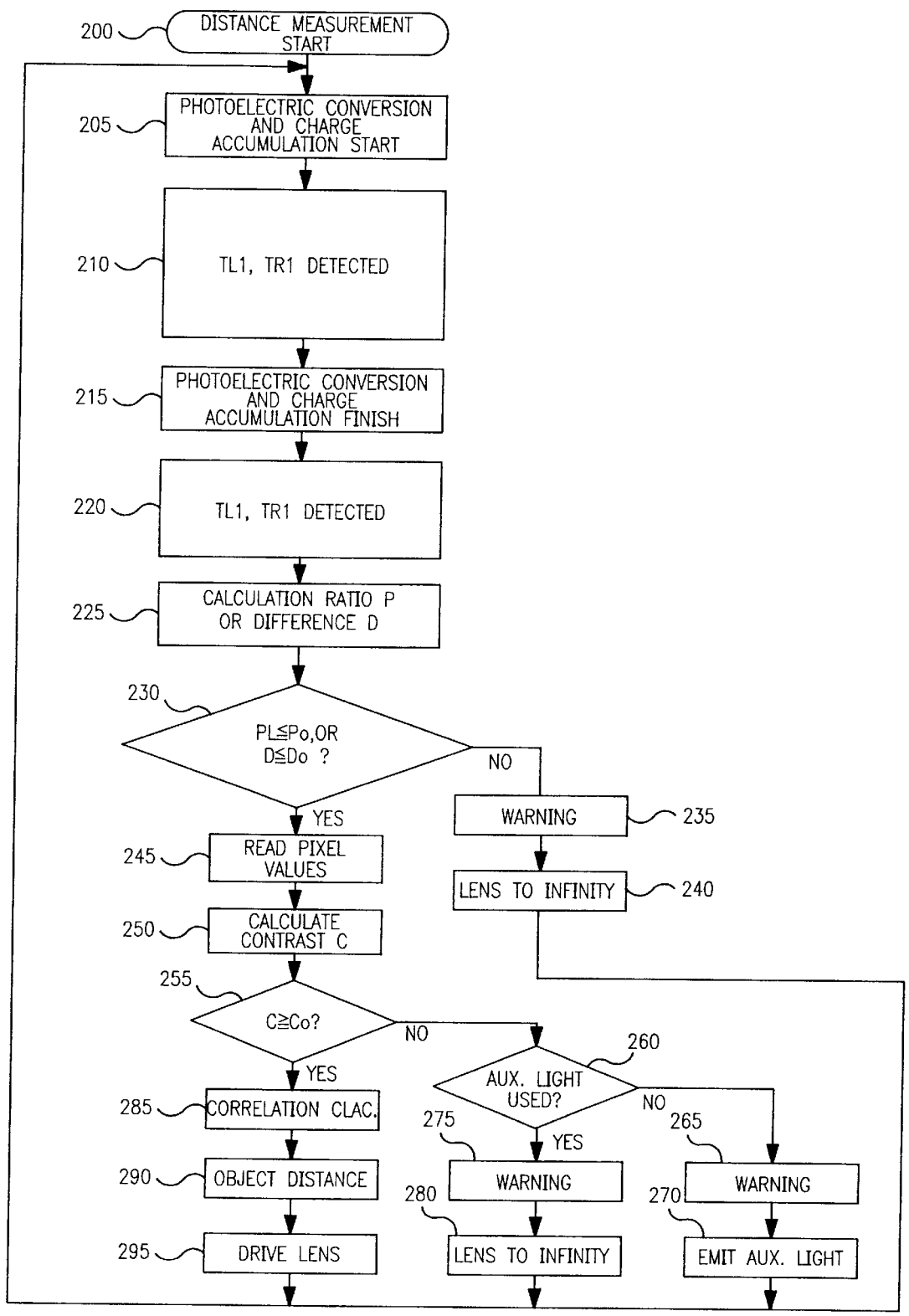
FIG. 7 is a flow chart showing a sequence of the distance measurement routine in the second embodiment.
Figure 8A:
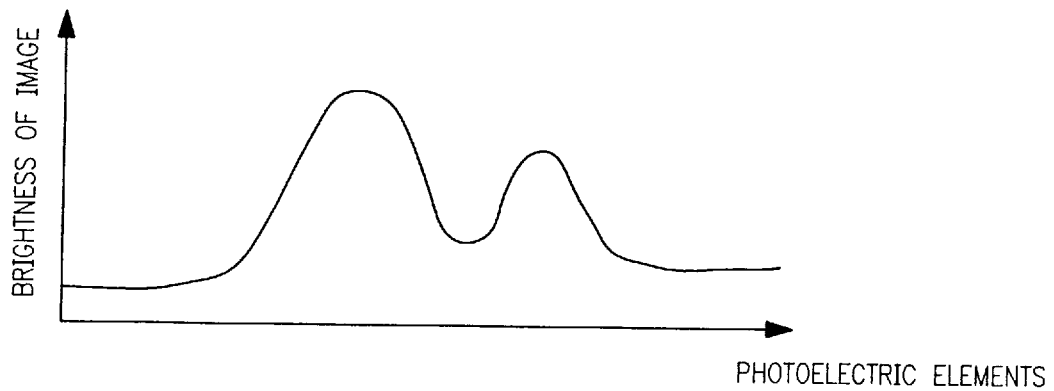
FIG. 8 shows a relationship between the brightness of the image on a line sensor and the period of time required for the potentials of the photoelectric conversion elements comprising the line sensor to reach a prescribed level.
Figure 8B:
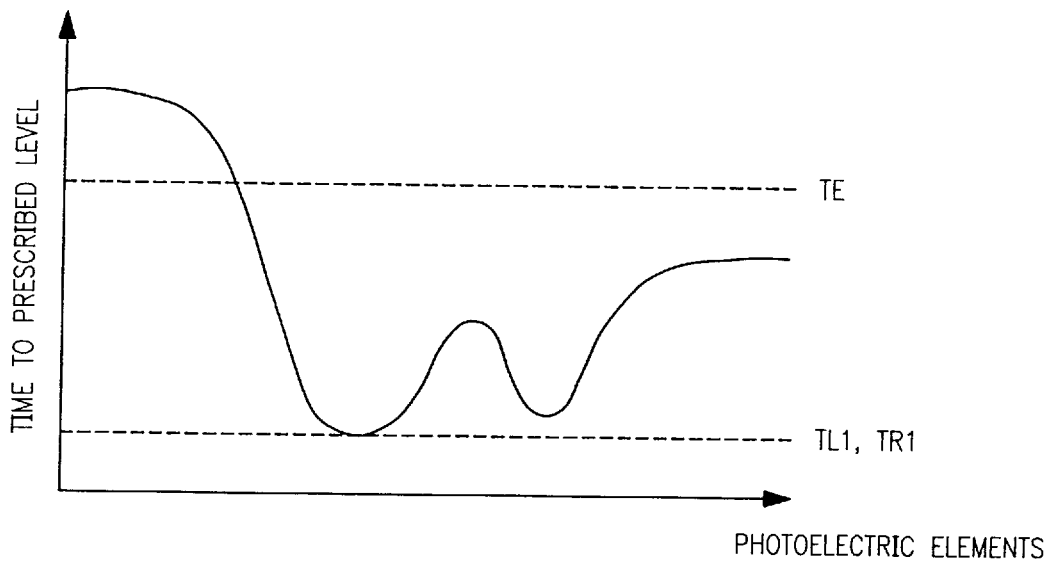

A second embodiment of the distance measurement system of the present invention will now be explained with reference to FIGS. 6 through 8. In this embodiment, the possibility of distance measurement is determined based on the difference in the amount of light between the two line sensors.

The entire construction of the camera is as shown in FIG. 1, and is identical to the first embodiment. FIG. 6 shows the constructions of AFIC 3 and distance measurement calculation device 4 of the second embodiment. This explanation will focus mainly on the differences from the first embodiment. AFIC 3 has, in addition to left and right line sensors 31 and 32, two counters 34 and 35 and clock 36 that sends clock signals to the counters. The left and right line sensors each comprise 128 aligned photoelectric conversion elements 33.

The distance measurement calculation device 4 is equipped with a light amount difference detection unit 250 that determines before distance measurement calculation by the distance measurement calculation unit 60 whether or not the amounts of light received by the line sensors 31 and 32 are substantially equal, or in other words, whether or not the left and right images are substantially equal in brightness.

When the first latch signal is input from left line sensor 31 to the counter 34, the counter 34 outputs period TL1 up to that point to the light amount difference detection unit 250. Similarly, when the first latch signal is input from right line sensor 32 to the counter 35, the counter 35 outputs period TR1 up to that point to the light amount difference detection unit 250.

The periods TL1 and TR1 output from counters 34 and 35, respectively, each represent the time required for the accumulated charge of the brightest area, or in other words, the photoelectric conversion element having the largest amount of light received, in left and right line sensors 31 and 32, to reach a prescribed level. If the images on left and right line sensors 31 and 32 are so dark that none of the potentials of accumulation portions 33b of the photoelectric conversion elements has reached the prescribed level V0 within integration time TE, periods TL1 and TR1 represent integration time TE. FIG. 8 shows the relationship between the brightness of the image and the period of time required for the potentials of the photoelectric conversion elements to reach a prescribed level.

The light amount difference detection unit 250 comprises a light amount difference calculation circuit 251 and a first distance measurement possibility determination circuit 252. The light amount difference calculation circuit 251 is provided with two periods TL1 and TR1 from counters 34 and 35, respectively, and calculates a value P using equation (7).

$$P = |\log(TR1/TL1)/\log 2|$$
$$= |\log_2(TR1/TL1)|$$
(7)

The time required for the potential of accumulation elements 33b of photoelectric conversion portion 33 to reach the prescribed level V0 is inversely proportional to the brightness of the area of the image formed on that photoelectric conversion element. Therefore, the farther away TR1/TL1 is from 1, the larger the difference in brightness between the brightest areas of left and right line sensors 31 and 32. The value P that is obtained via equation (7) as the absolute value of the logarithm of this value of a ratio represents the relative $E_v$ value regarding the brightest areas of the left and right images: the brightness differs by 100% each time the value increases or decreases by one. Where there is no difference in brightness between the left and right brightest areas, the value of P will be zero.

However, where both periods TL1 and TR1 represent integration time TE, the light amount difference calculation circuit 251 sets a large value for value P. Through this setting, when the two periods TL1 and TR1 become equal due to the termination of integration, a situation in which value P is zero can be avoided.

The first distance measurement possibility determination circuit 252 determines whether or not the images formed on left and right line sensors 31 and 32 have appropriately similar levels of brightness for the purpose of distance measurement. Specifically, the value P is compared with the prescribed value P0, and where the value P is equal to or smaller than the value P0, it is determined that distance measurement is possible, and where the value P is larger than the value P0, it is determined that the difference in brightness between the left and right images is too large, rendering distance measurement impossible.

Where it is determined in this step that distance measurement is not possible, distance measurement possibility determination circuit 252 lights the LED of the warning device 11 to inform the user that distance measurement is not possible and controls the lens drive device 6 such that the focus of photo-taking lens 6 is adjusted to infinity.

Instead of calculating the difference in brightness between the brightest areas of the images on left and right line sensors 31 and 32 as the value of a ratio using equation (7), the light amount difference calculation circuit 251 may calculate the difference in brightness between the brightest areas of the left and right images as a difference between the periods of time that have elapsed, using equation (8).

$$D = |TR1 - TL1|$$
(8)

And then, the first distance measurement possibility determination circuit 252 compares the value D with a prescribed value D0, and determines that distance measurement is possible when the value D is equal to or smaller than the value D0. In this case as well, where both periods TL1 and TR1 represent integration time TE, the light amount difference calculation circuit 251 sets a large value for the value D.

Where it is determined based on the value P or the value D that the images on left and right line sensors 31 and 32 have approximately the same levels of brightness, the first distance measurement possibility determination circuit 252 provides the signals OUT to left and right line sensors 31 and 32, instructing the sensors to output the potentials of accumulation portions 32b. Each photoelectric conversion elements 33 outputs the potential of accumulation portion 33b to the distance measurement calculation unit 60 in response to this signal OUT.

The distance measurement calculation unit 60 comprises A/D converters 61 and 62, RAMs 63 and 64, a difference circuits 65 and 66, RAMs 67 and 68, a contrast calculation circuit 69, a second distance measurement possibility determination circuit 70, a correlation calculation circuit 71 and an object distance calculation circuit 72. This construction is identical to that of the first embodiment, and the contrast calculation circuit 69 shown in FIG. 6 is identical to second contrast calculation circuit 69 shown in FIG. 2. With regard to the processing routine performed by the distance measurement calculation unit 60 as well, the contrast is calculated based on equation (5), and the possibility of distance measurement is determined based on the result of the calculation, in the same way as in the first embodiment. If it is determined to be possible, correlation calculation takes place based on equation (6), whereupon object distance calculation is performed.

The routine of the distance measurement process described above is shown in the flow chart in FIG. 7. The routine for the switch S1 turning ON is the same as in FIG. 3. The distance measurement routine starts via the pressing of the shutter release button down to the first stroke (step #200), and photoelectric conversion and charge accumulation commence based on integration start signals INT (step #205). As photoelectric conversion progresses, the accumulated potentials of photoelectric conversion elements 33 increase, and period of time TL1 (TR1) in which the potential of the brightest area reached the prescribed level V0 is detected (step #210). The integration termination signals TRM are issued when the prescribed integration time TE has elapsed, whereupon photoelectric conversion and charge accumulation are terminated (step #215). Where the potential of the brightest area has not reached the prescribed level V0, the period TL1 (TR1) is detected at this time. (step #220).

The difference in brightness between the brightest areas of the left and right images is detected by obtaining the ratio P or the difference D between periods TL1 and TR1 (step #225). Then the value of ratio P or the difference D is compared with the prescribed value P0 or D0, and it is determined whether the images on the two line sensors have approximately the same levels of brightness (step #230). Where the levels of brightness are substantially different, the user is warned that distance measurement is not possible (step #235), and the focus of photo-taking lens 5 is adjusted to infinity (step #240). Then the process returns to step #205, whereupon photoelectric conversion and charge accumulation are begun once again.

Where it is determined in step #230 that the levels of brightness of the images on the two line sensors are approximately the same, the potentials of the photoelectric conversion elements, or pixel values, of line sensors 31 and 32 are read to the distance measurement calculation unit 60 (step #245). Contrast is then calculated from the differences in pixel value between adjacent pixels (step #250). It is then determined by comparing the contrast value C thus calculated with the prescribed value C0 whether or not reliable correlation calculation can be performed (step #255).

Where the contrast value C is smaller than the prescribed value C0, it is determined that the reliability will be low due to inadequate contrast, and determination is then made as to whether or not the auxiliary light was used for that charge accumulation (step #260). Where the auxiliary light was not used, the user is warned that the contrast is inadequate (step #265), the auxiliary light is emitted (step #270), and photoelectric conversion and charge accumulation are performed once again (step #205). Where it is determined in step #260 that the auxiliary light was used, the user is warned that distance measurement is not possible (step #275), and the focus of the photo-taking lens 5 is adjusted to infinity (step #280). Then the process returns to step #205, whereupon photoelectric conversion and charge accumulation are begun once again. Where the contrast value C is equal to or larger than the prescribed value C0, it is determined that object distance can be calculated with high reliability, whereupon correlation calculation regarding the images on the two line sensors is performed (step #285), the object distance is calculated (step #290), and the phototaking lens 5 is driven to be in focus relative to the object (step #295).

While the sequence after the reading of the potentials of the photoelectric conversion elements of line sensors 31 and 32 is approximately the same as in the conventional method, the present invention differs from the conventional distance measurement system in that determination is made as to the difference in brightness between the brightest areas of line sensors 31 and 32 prior to the reading of the potentials. The detection of first periods TL1 and TR1 is performed in conjunction with the photoelectric conversion and charge accumulation, and determination as to the difference in brightness between the brightest areas of the left and right images is completed before the termination of charge accumulation, or immediately after the termination of charge accumulation at the latest. Therefore, where there is a substantial difference in brightness between the left and right images, appropriate countermeasures can be taken immediately without performing reading of the potentials of the photoelectric conversion elements, which requires a long time, or correlation calculation.

Using the distance measurement system pertaining to the second embodiment of the present invention, as described above, where the light from the object of distance measurement does not reach one of the photoelectric conversion element arrays and therefore distance measurement cannot be carried out, or where accurate distance measurement is not possible because of the occurrence of optical noise, the fact can be promptly detected, and erroneous distance measurement results and wasteful performance of calculation can be avoided at the same time. Accordingly, the accuracy in distance measurement increases, which in turn improves the efficiency of the distance measurement routine.

Third Embodiment

Figure 9:
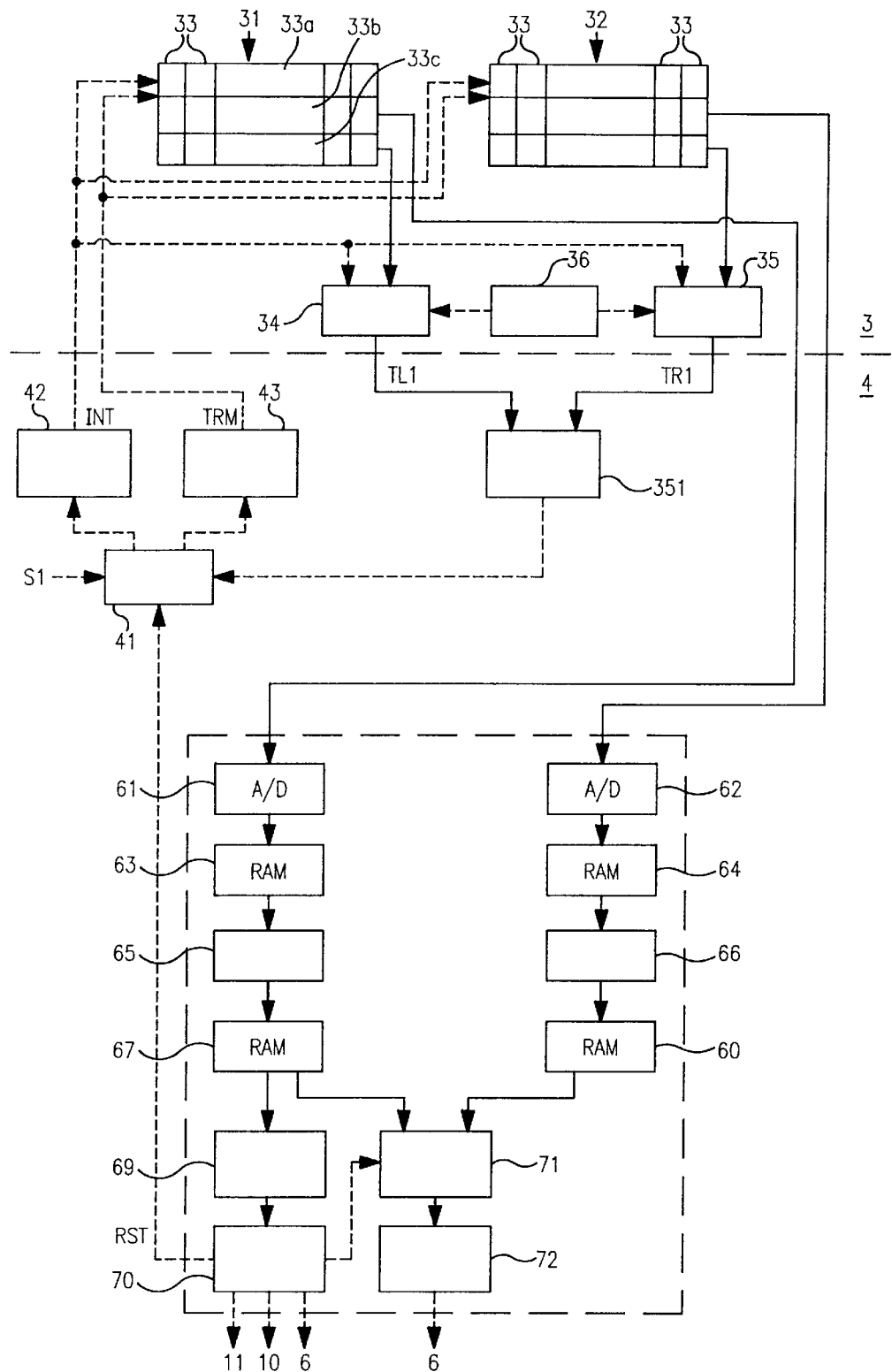
FIG. 9 is a block diagram showing the constructions of a distance measurement IC and a distance measurement calculation device, as well as the flow of signals in a third embodiment.
Figure 10:
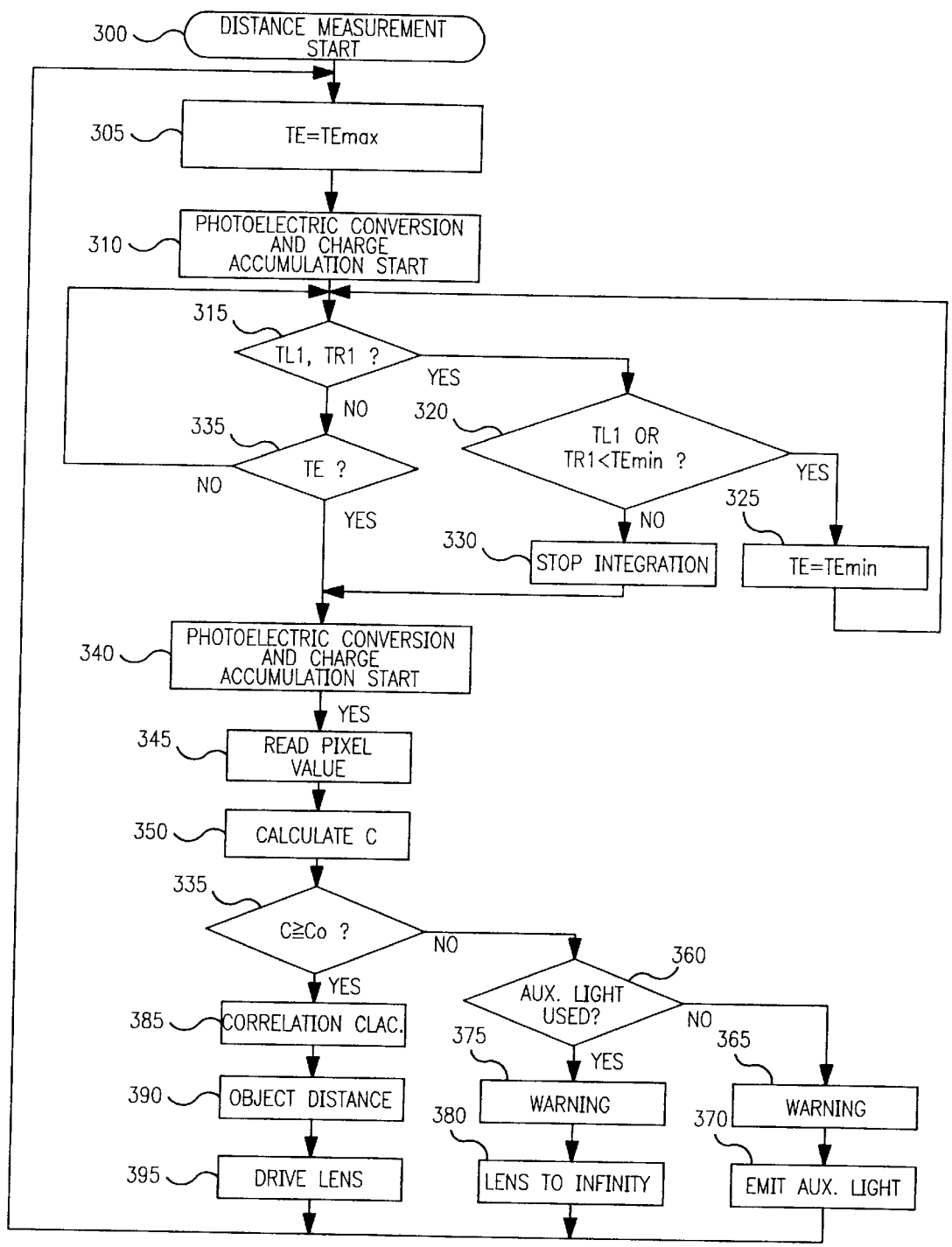
FIG. 10 is a flow chart showing the sequence of the distance measurement routine in the third embodiment.
Figure 11A:
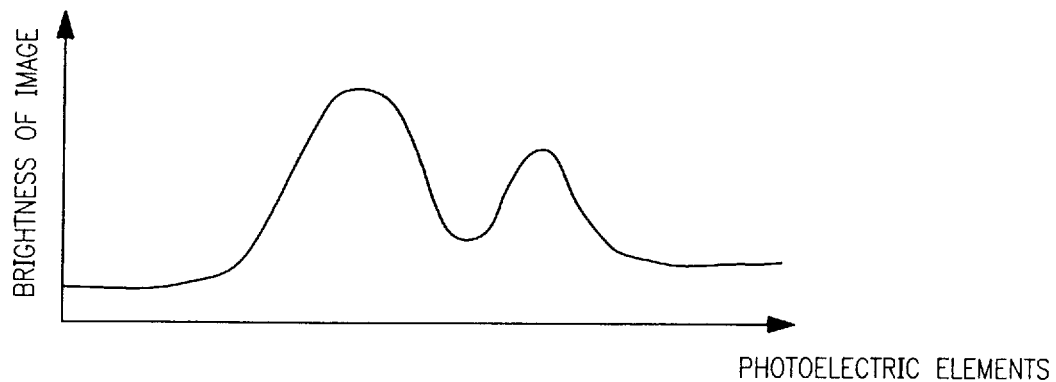
FIG. 11 shows a relationship between the brightness of the image on a line sensor and the period of time required for the potentials of the photoelectric conversion elements comprising the line sensor to reach a prescribed level.
Figure 11B:
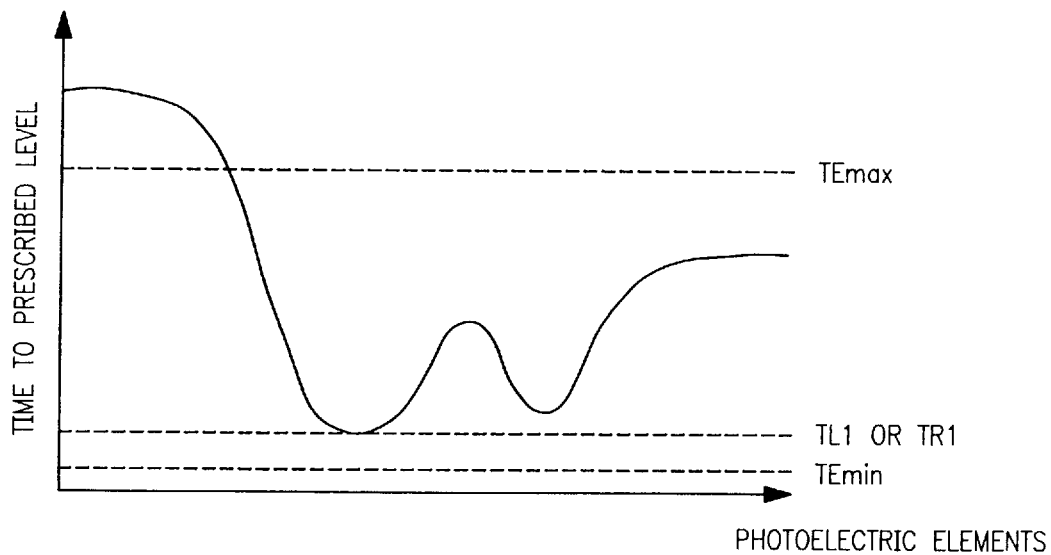

A third embodiment of the distance measurement system of the present invention will now be explained with reference to FIGS. 9 through 11. This embodiment is constructed such that distance measurement may be performed reliably and speedily by changing the integration time in accordance with the levels of brightness of the images formed on the line sensors. The entire construction of the camera is as shown in FIG. 1, and is identical to that of the first embodiment. FIG. 9 shows the constructions of AFIC 3 and distance measurement calculation device 4 of the third embodiment. This explanation will focus mainly on the differences from the first embodiment.

AFIC 3 has, in addition to left and right line sensors 31 and 32, two counters 34 and 35 and clock 36 that provides clock signals to the counters. Each of photoelectric conversion elements 33 that comprise left and right line sensors 31 and 32 comprises photoreceptor portion 33$a$, accumulation portion 33$b$ and latch portion 33$c$. Left and right line sensors 31 and 32 each comprise 128 aligned photoelectric conversion elements 33.

The distance measurement calculation device 4 is equipped with the timer 41 that starts based on the closing of the switch S1, the integration start instruction circuit 42 that generates integration the start signals INT that instruct line sensors 31 and 32 to start photoelectric conversion and charge accumulation, and the integration termination instruction circuit 43 that generates the integration termination signals TRM that instruct line sensors 31 and 32 to terminate photoelectric conversion and charge accumulation. The period of time in which photoelectric conversion and charge accumulation are performed, or in other words, integration time TE, is not fixed at a certain value, but is variable in the range between minimum integration time TEmin and maximum integration time TEmax, inclusive, in response to the amount of light received by line sensor 31 or 32. The minimum integration time TEmin is set to be a value that will allow the image of an object that is darker than an object with average brightness to have adequate brightness. The distance measurement calculation device 4 is equipped with the integration time setting circuit 351 that sets this integration time, and the distance measurement calculation unit 60 that performs various calculations for the purpose of distance measurement.

When the shutter release button is pressed down to the first stroke and the switch S1 closes, the timer 41 starts the counting of time and sends integration start instruction circuit 42 a signal to instruct the generation of signals. The timer 41 has the minimum integration time TEmin and the maximum integration time TEmax in its memory, and sets maximum integration time TEmax for integration time TE simultaneously with the commencement of time counting. This integration time TE is switched to minimum integration time TEmin based on a signal provided by integration time setting circuit 351. The timer 41 sends the integration termination instruction circuit 43 a signal to instruct the generation of signals when the integration time TE has elapsed.

Based on the instruction signal from the timer 41, integration start instruction circuit 42 provides integration start signals INT to left and right line sensors 31 and 32. These integration start signals INT are also provided to the counters 34 and 35, whereupon the counters 34 and 35 start the counting of time based on the clock signals from clock 36.

The counter 34 counts the number of latch signals input from the left line sensor 31. When a prescribed number of latch signals has been input, period of time TL1 that has elapsed up to that point is output to the integration time setting circuit 351. Similarly, the counter 35 counts the number of latch signals input from the right line sensor 32, and when a prescribed number of latch signals has been input, it outputs period of time TR1 that has elapsed up to that time to integration time setting circuit 351. This embodiment is designed such that the counters 34 and 35 output periods TL1 and TR1, respectively, when the first latch signal is input. These periods TL1 and TR1 each represent the time required for the accumulated potential of the brightest area, or the photoelectric conversion element having the largest amount of light received, of each of left and right line sensors 31 and 32 to reach the prescribed level. FIG. 11 shows the relationship between the brightness of the image and the time that has elapsed and the relationship between minimum integration time TEmin and maximum integration time TEmax.

The integration time setting circuit 351 has minimum integration time TEmin in its memory. When it is provided with periods TL1 and TR1 from counters 34 and 35, respectively, it compares each of these periods with minimum integration time TEmin. Where either TL1 or TR1, whichever was provided first, is smaller than TEmin, the integration time setting circuit 351 sends the timer 41 an instruction signal to change integration time TE to minimum integration time TEmin. Consequently, when minimum integration time TEmin has elapsed, the timer 41 instructs integration termination instruction circuit 43 to generate integration termination signals TRM. On the other hand, where either TL1 or TR1, whichever was provided first, is equal to or larger than TEmin, the timer 41 immediately provides integration termination instruction circuit 43 a signal to instruct the generation of integration termination signals TRM.

Upon receiving a signal from the timer 41 or integration time setting circuit 351, the integration termination instruction circuit 43 provides the integration termination signals TRM to all photoelectric conversion elements 33. Based on the integration termination signal TRM, photoreceptor portion 33a of each photoelectric conversion element 33 stops photoelectric conversion. The accumulation portion 33b outputs to the distance measurement calculation unit 60 the potential corresponding to the accumulated charge.

Because the integration time setting circuit 351 and the timer 41 operate as described above, line sensors 31 and 32 perform photoelectric conversion and charge accumulation for at least the minimum integration time TEmin, and at the same time, integration is continued until the photoelectric conversion element of the brightest area of one of the line sensors has accumulated charge to the prescribed level, while integration is discontinued when the accumulated charge has reached the prescribed level. Where none of photoelectric conversion elements 33 of either left or right line sensor 31 or 32 has accumulated the prescribed amount of charge within maximum integration time TEmax, latch signals are not output, and neither of period TL1 or TR1 is provided to integration time setting circuit 351. As a result, the integration time TE of the timer 41 is not changed. Therefore, the timer 41 provides integration termination instruction circuit 43 a signal to instruct the generation of integration termination signals TRM when maximum integration time TEmax has elapsed: consequently, integration is performed for as long as maximum integration time TEmax.

The distance measurement calculation unit 60 comprises A/D converters 61 and 62, RAMs 63 and 64, difference circuits 65 and 66, RAMs 67 and 68, a contrast calculation circuit 69, a distance measurement possibility determination circuit 70, a correlation calculation circuit 71 and an object distance calculation circuit 72. This construction is identical to that of the first embodiment, and the contrast calculation circuit 69 shown in FIG. 9 is identical to the second contrast calculation circuit 69 shown in FIG. 2. With regard to the processing routine performed by the distance measurement calculation unit 60 as well, the contrast is calculated based on equation (5), and the possibility of distance measurement is determined based on the result of the calculation, in the same way as in the first embodiment. If it is determined to be possible, correlation calculation takes place based on equation (6), whereupon object distance calculation is performed.

Where it is determined that distance measurement is not possible, the distance measurement possibility determination circuit 70 causes the LED of the warning device 11 to flash in order to notify the user that the contrast is inadequate, and simultaneously sends the timer 41 restart signal RST, causing photoelectric conversion and charge accumulation to be performed by line sensors 31 and 32 once again. When this takes place, the distance measurement possibility determination circuit 52 causes the auxiliary light device 10 to emit light to irradiate the object. Where the entire object is dark and a sufficient amount of light cannot be received even by performing integration for as long as maximum integration time TEmax, distance measurement is made possible by irradiating the object using distance measurement auxiliary light as described above. When the calculated contrast value C is smaller than a prescribed value C0 even after photoelectric conversion and charge accumulation are carried out once more following irradiation from the auxiliary light, the LED of the warning device 11 is lit continuously to notify the user that distance measurement is not possible, and the lens drive device 6 is controlled such that the focus of the photo-taking lens 5 is adjusted to infinity.

The routine of the distance measurement process described above is shown in the flow chart in FIG. 10. The routine for the switch S1 turning ON is the same as in FIG. 3. The distance measurement routine starts via the pressing of the shutter release button down to the first stroke (step #300), and the timer 41 sets maximum integration time TEmax for integration time TE (step #305). Photoelectric conversion and charge accumulation are begun by means of integration start signals INT (step #310). After the commencement of integration, it is monitored at all times, based on periods TL1 and TR1 output from the counters 34 and 35, respectively, whether or not the potentials of the brightest areas of left and right line sensors 31 and 32 have reached prescribed level V0 (step #315).

Where the period TL1 or TR1 is detected, its value is compared with minimum integration time TEmin (step #320). Where the period TL1 or TR1 is smaller than minimum integration time TEmin, the integration time TE is changed to minimum integration time TEmin (step #325), and the process is returned to step #315. Where the period TL1 or TR1 is equal to or larger than the minimum integration time TEmin, integration is immediately terminated (step #330).

Where neither of period TL1 or TR1 was detected in step #315, it is determined whether or not integration time TE that was set has elapsed (step #335). Where the integration time TE has not elapsed yet, the process is returned to step #315 Where the time TE has elapsed, integration is terminated.

After photoelectric conversion and charge accumulation are terminated (step #340), the potentials, or the pixel values, of the photoelectric conversion elements of line sensors 31 and 32 are read to distance measurement calculation unit 60 (step #345). Then the contrast is calculated from the differences in value between adjacent pixels (step #350). By comparing the contrast value C thus calculated with a prescribed value C0, it is determined whether or not reliable correlation calculation can be made (step #355).

Where the contrast value C is smaller than prescribed value C0, it is determined that the reliability will be low due to inadequate contrast, and it is determined whether the auxiliary light was used for that charge accumulation (step #360). Where the auxiliary light was not used, the user is warned that the contrast is inadequate (step #365), the auxiliary light is made to emit light (step #370), and photoelectric conversion and charge accumulation are performed once again (step #305). Where it is determined in step #360 that the auxiliary light was used, the user is warned that distance measurement cannot be performed (step #375), and the focus of the photo-taking lens 5 is adjusted to infinity (step #380). Then, the process is returned to step #305, whereupon photoelectric conversion and charge accumulation are begun once again. Where the contrast value C is equal to or larger than the prescribed value C0, it is determined that the object distance can be calculated with high reliability, whereupon correlation calculation regarding the images on the two line sensors is carried out (step #385), the object distance is calculated (step #390), and the photo-taking lens 5 is driven to be in focus relative to the object (step #395).

The setting of the integration time corresponding to the brightness of the object and distance measurement take place in this way. Where the object is bright, integration is terminated within minimum integration time TEmin, or a time close to it, so that distance measurement can be performed speedily. Where the object is dark, the integration time is extended in response to the level of darkness of the object, and therefore, precise distance measurement can be carried out using the shortest possible integration time that permits the precise distance measurement. However, where the object is so dark that distance measurement cannot be made unless integration is performed for a very long time, it is pointless to extend the integration time indefinitely since the object will move. By setting maximum integration time TEmax, such pointless integration can be avoided.

While a case in which integration is terminated when the potential of a photoelectric conversion element of one of left and right line sensors 31 and 32 has reached a prescribed value V0 was explained in connection with this embodiment, it is also acceptable if integration continues until the potentials of photoelectric conversion elements of both left and right line sensors 31 and 32 reach the prescribed value V0. In this case, the integration time setting circuit 351 changes the integration time based on period TL1 or TR1, whichever was provided later. In other words, where later period TL1 or TR1 is smaller than the minimum integration time TEmin, an instruction signal to change integration time TE to minimum integration time TEmin is sent to the timer 41, and where later period TL1 or TR1 is equal to or larger than TEmin, a signal that instructs the generation of the integration termination signals TRM is immediately sent to the integration termination instruction circuit 43. By setting integration time in this way, both line sensors 31 and 32 reliably receive an amount of light that is equal to or larger than a prescribed level, which in turn improves the reliability of the correlation calculation for distance measurement and allows the object distance to be obtained with increased accuracy.

Further, while the counters 34 and 35 were set such that the periods TL1 and TR1 respectively are output when the first latch signal is input, it is also acceptable if, when the 30th latch signal is input to the counters, for example, the period of time up to that point is output as TL1 or TR1. By using such setting, integration is terminated when approximately a quarter of all the photoelectric conversion elements have reached the prescribed potential, and a certain range of the image on each of line sensors 31 and 32 will have a brightness equal to or larger than a certain level. In addition, even if one photoelectric conversion element issues a latch signal due to a reason such as generation of noise, integration is not immediately terminated, avoiding the erroneous setting of integration time.

It is also acceptable if integration is not terminated immediately upon a photoelectric conversion element reaching the prescribed potential level V0 after minimum integration time TEmin elapses, but if integration time TE is instead extended by prescribed period $\Delta TE$, (TE+$\Delta TE$). In this case, however, such extension should be made within a range not exceeding maximum integration time TEmax.

As described above, using the distance measurement system pertaining to the third embodiment of the present invention, since the time for photoelectric conversion by the photoelectric conversion element arrays is extended in response to the darkness of the object of distance measurement, distance measurement can be accurately performed at all times regardless of whether the object is bright or dark. In addition, since the time for photoelectric conversion is not unnecessarily extended when the object of distance measurement is bright, distance measurement can be carried out speedily.

Figure 12:
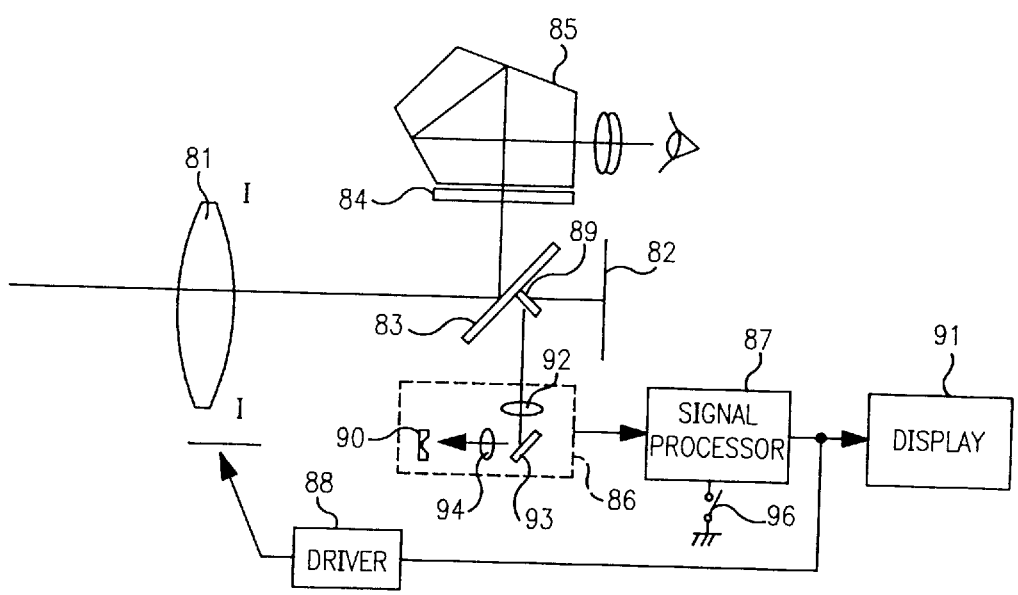
FIG. 12 shows an outline construction of a single lens reflex camera in which a focus detection system, an embodiment of the present invention, is applied.

While explanations have been provided with regard to the embodiments described above with reference to a type of camera in which the distance measurement optical system and the photo-taking optical system are separate, the present invention can naturally also be applied in a type of camera which uses one optical system and in which the focal status of the photo-taking lens is detected, as shown in FIG. 12, or in other words, in a so-called single reflex camera. A photo-taking film 82 is located such that it is fed behind a photo-taking lens 81, and a reflecting mirror 83 is placed in front of the photo-taking film 82. The reflecting mirror 83 is retractably located in the optical path from the photo-taking lens 81 to film 82. It is normally located in the optical path and reflects the light that has passed through the photo-taking lens upward to a focusing screen 84 and a pentagonal prism 85. The center of the reflecting mirror 83 is translucent. Behind the center of the reflecting mirror 83, a small secondary reflecting mirror 89 is placed that leads the light to light receiving unit 86 located below. Inside the light receiving unit 86, the optical flux is led to the light receiving elements, i.e., line sensor 90, for example, via condenser lens 92, reflecting mirror 93 and image re-forming lens 94.

The light receiving unit 86 outputs an electric signal in response to the light detected, and a focus detection routine takes place in a signal processor 87. Based on the result of the processing, the photo-taking lens 81 is driven via a driver 88 to an in-focus position, and then the in-focus state is shown on a display 91.

A switch 96 that instructs the commencement of focus detection closes when the shutter release button is pressed down to the first stroke, for example, whereupon the focus detection operation begins. The signal processor 87 determines whether or not focus detection is possible in the same manner as in the first through third embodiments described above. Where it is determined to be possible, focus detection is performed, and where it is determined to be not possible, countermeasures including warning display and auxiliary light emission are taken.

Obviously, many modifications and variation of the present invention are possible in light of the above teachings. It is therefore to be understood that within the scope of the appended claims, the invention may be practiced other than as specifically described.

What is claimed is:

1. A measurement apparatus that detects prescribed information of an object by leading the light from the object to be measured to a pair of light receiving element arrays and performing a comparative calculation of distributions of charge accumulated in the light receiving element arrays, comprising:

a first timer that counts a period of time required for the charge accumulated in a light receiving element of at least one of the light receiving element arrays, which first attained a prescribed level of accumulated charge, to reach the prescribed level;

a second timer that counts a period of time required for the accumulated charges of all light receiving elements of at least one of the light element arrays to reach the prescribed level;

a determiner that determines whether or not measurement is possible based on the period of time counted by the first timer and the period of time counted by the second timer; and a calculator that carries out said comparative calculation when it is determined by said determiner that measurement is possible.

2. A measurement apparatus as claimed in claim 1, wherein said determiner determines whether or not measurement is possible based on difference between the period of time counted by the first timer and the period of time counted by the second timer or ratio of the period of time counted by the first timer to the period of time counted by the second timer.

3. A measurement apparatus as claimed in claim 2, wherein said determiner determines measurement is possible when said difference or ratio is equal to or larger than a prescribed value.

4. A measurement apparatus as claimed in claim 1, further comprising a light emitting device which emits auxiliary light for the measurement, wherein said measurement apparatus performs charge accumulation in the light receiving element arrays in emitting said auxiliary light when it is determined that the measurement is not possible.

5. A measurement apparatus that detects prescribed information of an object by leading the light from the object to be measured to a pair of light receiving element arrays and performing a comparative calculation of the distributions of charge accumulated in the light receiving element arrays, comprising:

a first timer that counts the period of time required for the charge accumulated in a light receiving element of at least one of the light receiving element arrays, which first attained a prescribed level of accumulated charge, to reach the prescribed level;

a second timer that counts a prescribed period of time set for accumulating charge;

a determiner that determines whether or not measurement is possible based on the period of time counted by the first timer and the period of time counted by the second timer; and a calculator that carries out said comparative calculation when it is determined by said determiner that measurement is possible.

6. A measurement apparatus as claimed in claim 5, wherein said determiner determines whether or not measurement is possible based on difference between the period of time counted by the first timer and the period of time counted by the second timer or ratio of the period of time counted by the first timer to the period of time counted by the second timer.

7. A measurement apparatus as claimed in claim 6, wherein said determiner determines measurement is possible when said difference or ratio is equal to or larger than a prescribed value.

8. A measurement apparatus as claimed in claim 5, further comprising a light emitting device which emits auxiliary light for the measurement, wherein said measurement apparatus accumulates charge in the light receiving element arrays in emitting said auxiliary light when it is determined that the measurement is not possible.

9. An image information detection system that detects prescribed information of an object by leading the light from the object to be detected to a pair of light receiving element arrays and performing a comparative calculation of the distributions of charge accumulated in the light receiving element arrays, the image information detection system comprising:

a first timer that counts the period of time required for the charge accumulated in a light receiving element of one of the light receiving element arrays, which first attained a prescribed level of accumulated charge, to reach said prescribed level;

a second timer that counts the period of time required for the accumulated charges of all light receiving elements of one of the light element arrays to reach the prescribed level;

a determiner that determines whether or not detected is possible based on the period of time counted by the first timer and the period of time counted by the second timer; and a calculator that carries out said comparative calculation when it is determined by said determiner that detection is possible.

10. A measurement apparatus that detects prescribed information of an object by leading the light from the object to be measured to a pair of light receiving element arrays and performing a comparative calculation of distributions of charge accumulated in the light receiving element arrays, comprising:

a first timer that counts a period of time required for the charge accumulated in a light receiving element of at least one of the light receiving element arrays, which first attained a prescribed level of accumulated charge, to reach the prescribed level;

a second timer that counts a prescribed period of time which is related to accumulating charges in the light receiving element arrays;

a determiner that determines whether or not measurement is possible based on the period of time counted by the first timer and the period of time counted by the second timer; and a calculator that carries out said comparative calculation when it is determined by said determiner that measurement is possible.

* * * * *